United States Patent [19]

Redman

[11] Patent Number: 5,057,556
[45] Date of Patent: Oct. 15, 1991

[54] COATING COMPOSITIONS COMPRISING NON-GELLED AMINE-EPOXIDE REACTION PRODUCTS

[75] Inventor: Richard P. Redman, Rochester Hills, Mich.

[73] Assignee: Imperial Chemical Industries PLC, London, England

[21] Appl. No.: 425,054

[22] Filed: Oct. 23, 1989

[30] Foreign Application Priority Data

Oct. 28, 1988 [GB] United Kingdom ................ 8825315

[51] Int. Cl.$^5$ ...................... C08G 59/50; C09D 5/44; C08L 63/00
[52] U.S. Cl. .................................... 523/404; 523/415; 523/416; 523/417; 528/99; 528/111; 564/283; 564/286; 564/287; 564/319; 564/348
[58] Field of Search ............... 523/404, 415, 416, 417; 528/99, 111

[56] References Cited

U.S. PATENT DOCUMENTS 3,299,169  1/1967  Smith .................................. 260/830
3,929,717  12/1985  Lee .................................. 260/37 EP
4,229,335  10/1980  Ting et al. ...................... 260/29.4 R

FOREIGN PATENT DOCUMENTS 0200397  10/1986  European Pat. Off. .

Primary Examiner—Earl Nielsen
Assistant Examiner—Frederick Krass
Attorney, Agent, or Firm—Cushman, Darby & Cushman

[57] ABSTRACT

A non-gelled amine-epoxide reaction product and acid addition salts thereof where the product is obtained by co-reacting;

a) a secondary amine $NHR^1R^2$, wherein $R^1$ and $R^2$ the same or different are $C_2$ or $C_3$ hydroxyalkyl groups,
b) a polyepoxide,
c) optionally a polyoxyalkylene polyamine,
d) a product of the reaction between an epoxide with at least two epoxy groups and which contains less than 40% by weight of aromatic groups, and an amine of formula (1):

$$NR^3R^4(CH_2)_nNH_2 \qquad (1)$$

in which n is from 2 to 6, and where $R^3$ and $R^4$, the same or different are methyl or ethyl, and optionally,
e) a monoepoxide the components of product (D) being chosen so that the non-gelled amine epxoide reaction product is a liquid at temperature above $-5°$ C.

18 Claims, No Drawings

COATING COMPOSITIONS COMPRISING NON-GELLED AMINE-EPOXIDE REACTION PRODUCTS

This invention relates to amine epoxide reaction products which may be used in coating compositions suitable for application to a substrate by electrodeposition.

It is known that aqueous dispersions of ionisable salts of certain amine epoxide reaction products are useful in coating compositions which can be applied to a cathodic substrate by electrodeposition. Particularly useful reaction products of this type are described in our published European Patent Application No. EP2003-97A. These are prepared by reacting together a polyepoxide, a polyoxyalkylene polyamine, a secondary amine and optionally a monoepoxide. Aqueous dispersions of such reaction products may be formed by neutralisation of the resin with suitable acids and these are stable at moderate pH values. Such dispersions to produce films that have a number of advantages including ability to protect a coated substrate against corrosion.

Protection against corrosion is especially important for ferrous metal substrates for example, motor vehicle bodies, that are liable to damage from scratches that penetrate the film. The resultant corrosion leads to rusting and a deterioration in the appearance of the vehicle.

The performance of a coating composition in the protection of a substrate against corrosion may be measured in the laboratory by use of the General Motors Cyclical Corrosion Test (number 54–26). This is known as the Scab Corrosion Test.

We have now discovered certain amine epoxide reaction products which as compared with the amine epoxide reaction products of EP200397A, show an improvement in the ability to protect a coated substrate against corrosion and rust.

According to the present invention, there is provided a non-gelled amine epoxide reaction product and acid addition salts thereof where the product is obtained by co-reacting;

A) a secondary amine $NHR^1R^2$, wherein $R^1$ and $R^2$ are the same or different and are $C_2$ or $C_3$ hydroxyalkyl groups, B) a polyepoxide, C) optionally a polyoxyalkylene polyamine, D) a product of the reaction between an epoxide with at least two epoxy groups and which contains less than 40% by weight of aromatic groups in the molecule and an amine of formula (1):

$$NR^3R^4(CH_2)_nNH_2 \qquad (1)$$

in which n is from 2 to 6, and where $R^3$ and $R^4$, are the same or different, and are methyl or ethyl, and optionally E) a monoepoxide, the components of the product (D) being chosen so that the non-gelled amine epoxide reaction product is a liquid at a temperature above $-5°$ C.

The amine epoxide reaction products of this invention are liquid at temperatures above $-5°$ C. and so can be dispersed easily in an acidified aqueous medium at normal ambient temperatures.

In the secondary amine (A), $R^1$ and $R^2$ can be in particular $-CH_2CH_2OH$ or $-CH_2CH_2CH_2OH$.

Examples of secondary amines (A) are dipropanolamine and diethanolamine. Preferably the secondary amine (A) is diethanolamine.

In practice the polyepoxide (B) has an epoxy functionality of from 1.1 to 2.0, more preferably 1.3 to 2.0.

Preferably the polyepoxide (B) has an epoxy equivalent weight in the range 150 to 2500, and more preferably in the range 400 to 1000.

Examples of polyepoxides (B) are the polyglycidyl ethers of polyphenols and chain extended epoxides.

Polyglycidyl ethers of polyphenols can be prepared by the etherification of a polyphenol with epichlorhydrin in the presence of an alkali. The polyphenol may be for example bis (4-hydroxyphenyl) -2,2-propane (known as bisphenol A).

Polyglycidyl ethers of polyphenols are commercially available as for example Araldite GY26000 from Ciba Giegy (Araldite is a Trademark) and Epikote 828 from Shell (Epikote is a Trademark).

Chain extended epoxides can be made by reaction (called chain extension) where a low molecular weight epoxide having at least two epoxy groups is reacted with a polyol.

Examples of low molecular weight epoxides with at least two epoxy groups are polyglycidyl ethers of polyphenols described above.

The polyol can be a simple $C_2$ to $C_{18}$ aliphatic or aromatic diol. Examples of $C_2$ to $C_{18}$ aliphatic diols are ethane-1, 2-diol, propane-1, 3-diol butane-1, 4-diol, hexane-1, 6-diol, octane-1, 8-diol and decane-1, 10-diol. Examples of aromatic diols are 2,2'-bis(4-hydroxyphenyl) propane (known as bisphenol A) and 2,2'-bis (4-hydroxyphenyl) methane (known as bisphenol F).

The polyol can also be a polyether polyol of formula $$H-O-(CH_2)_d-OH$$

where d is from 2 to 6 and e is from 2 to 100, especially polyoxytetramethylene glycols having molecular weights in the range 500 to 3000.

A further class of polyether polyols has the general formula

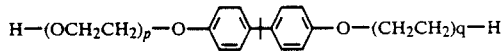

where p and g are nominally from 2 to 5. Such compounds are commerically available under the Trade Mark Dianol. Examples are Dianol 22 where p and q are both 2, Dianol 2211 which is a mixture of isomers such that the sum of p and q is 4, Dianol 2213 where the sum of p and q is 6.5 and Dianol 2214 where the sum of p and q is 8.5.

The polyol can also be a polycapralactone diol of formula

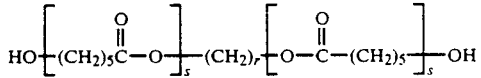

where r is from 1 to 6 and s is a number such that the molecular weight of the diol is from 530 to 2000.

The chain extension reaction may be carried out either with or without an inert solvent at temperatures between 50° and 200° C.

Suitable polyepoxides are commercially available from Shell Chemicals under the Registered Trade Mark Epikote, for example Epikote 1001, 1004 and 1007.

The polyepoxide (B) may be capped or uncapped. A polyepoxide is capped when a portion of the epoxy groups are reacted with a capping agent.

If the polyepoxide has an epoxide equivalent weight of less than 600 preferably it is capped. Examples of capping agents are monocarboxylic acids and phenols.

Examples of monocarboxylic acid capping agents are aromatic acids particularly benzoic acid, and $C_2$ to $C_{20}$ aliphatic acids particularly acetic propionic acid, dimethyl propionic acid, and stearic acid.

Examples of phenol capping agents are phenol, and phenols optionally bearing from one to three substituents which can be the same or different and are $C_1$ to $C_{12}$ alkyl (particularly methyl, ethyl, propyl, butyl, and nonyl), halogen or nitro, an optionally substituted phenyl phenol bearing on the phenolic ring from one to three optional substituents listed above, or a naphthol.

Examples of specific phenol capping agents are cresol, nonylphenol and tert-butylphenylphenol, phenylphenol, naphthol, nitrophenol, and chlorophenol.

Preferably the capping agent is nonylphenol.

Preferably not more than 50% of the original epoxy functionality of a polyepoxide is reacted with a capping agent. When a polyepoxide has a nominal epoxy functionality of approximately 2, for example as with the commercially available "Epikote" resins mentioned above, then preferably 2.5 to 25% more preferably 7.5–17.5%, of the epoxy groups are capped. It is found that the capping of epoxy groups in this way can contribute to the stability of derived aqueous emulsions.

Where the polyepoxide is to be produced from the chain extension of a low molecular weight epoxide and is to be reacted with a capping agent as described above, it is convenient to carry out both reactions together by mixing the epoxide, the diol, and the capping agent together and heating the mixture.

The polyoxyalkylene polyamine (C) preferably has an average molecular weight in the range 150 to 4000 more preferably in the range 200 to 2000.

Preferably the polyoxyalkylene polyamine (C) is a diamine or a triamine or a mixture of a diamine and a triamine.

The polyoxyalkylene polyamine (C) preferably has primary amino groups that contain two reactive hydrogen atoms. However after the first reactive hydrogen atom has been reacted with an epoxide, the second is much less reactive.

Thus while diamine may in theory have a functionality of up to 4, and a triamine may in theory have a functionality of up to 6, they generally have effective functionalities in their reactions with epoxide groups of 2 and 3 respectively.

Examples of polyoxyalkylene diamines are 3,3'-[1,2-ethanediylbis )oxy)]bis-1-propanamine or (4,7-dioxadecane-1,10-diamine), polyoxypropylene diamine, (Ether-diamine 230, 400 & 2000), 3,3'-[1,4-butane-diylbis ) oxy) ]bis-1-propanamine or (4,0-dioxadodecan-1,12-diamine) 3,3'-[oxybis (2,1-ethanediyloxy) ]bis-1-propanamine or (4,7,10-trioxatridecan-1,13-diamine), and bis(3-aminopropyl) -polytetrahydrofuran 750,1100 and 2100.

A particular class of polyoxyalkylene diamines within the scope of this invention are diamines of formula (2)

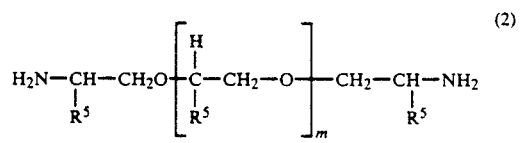

in which $R^5$ is hydrogen or $C_{1-6}$ alkyl and m is an integer from 1 to 50.

Polyoxyalkylene diamines of this type are commercially available from the Jefferson Chemical Company under the trademark "Jeffamine", for example as Jeffamine D-400 and Jeffamine D 2000.

Preferably the polyoxyalkylene polyamine is a triamine. A particular class of such triamines has the formula (3)

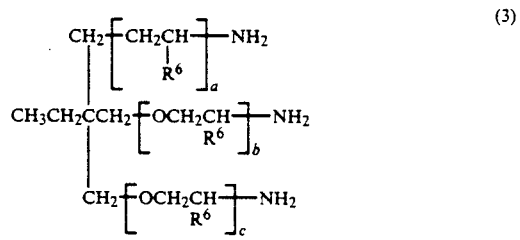

wherein $R^6$ is hydrogen or a $C_{1-6}$ alkyl group, and a, b and d are integers such that their sum is from 3 to 30. For example, $R^6$ can be methyl, ethyl, or propyl.

Such triamine are commercially available from the Jefferson Chemical Company under the Trade Mark Jeffamine. The components are supplied as a mixture of amines so that in practice the sum of a, b and c is a mean value and might not be an integer. One example of a triamine of this type is Jeffamine T-403 where the sum of a, b and c is 5.3 and $R^6$ is methyl.

The diepoxide used to produce the reaction product (D) can be any diepoxide that contains less than 40% by weight of aromatic groups in the molecule.

Preferably, the diepoxide contains less than 30% by weight of aromatic groups.

Examples of suitable diepoxides are the diglycidyl ethers of alkylene glycols or diols, or diglycidyl ethers of polyoxyalkylene glycols.

Preferably the diepoxide is a liquid at temperatures above 100° C. as this means that it does not have to be heated excessively before it can be handled easily. More preferably it is a liquid at temperatures above 25° C. and most preferably at temperatures above 15° C.

Suitable diepoxides include polyglicydyl ethers having an epoxide equivalent weight in the range 100 to 2500, preferably in the range 100 to 1000, more preferably in the range 100 to 500.

A specific example of a diepoxide which is the diglycidyl ether of an alkylene diol is hexanediol diglycidyl ether, (epoxide equivalent weight 146 available from EMS CHEMIE).

Specific examples of the diglycidyl ethers of polyoxyalkylene glycols are Dow epoxy resin XU71832 (epoxy equivalent weight about 340 available from Dow Chemicals), and polytetrahydrofuran diglycidyl ether (epoxide equivalent weight about 400 from EMS Chemie).

Another particularly suitable diglycidyl ether is XB 4122 (epoxide equivalent weight about 340 available from Ciba Geigy).

In the amine of formula (1) n is preferably 2 or 3.

Examples of amines of formula (1) are diethylaminopropylamine, dimethlyaminopropylamine, diethylaminobutylamine and dimethylaminoethylamine. Preferably it is dimethylaminopropylamine or diethylaminopropylamine, especially dimethylaminopropylamine.

In making the product (D), the ratios of the epoxide and the amine of formula (1) are chosen so that there is approximately one primary amine group from the amine of formula (1) for each epoxy group on the epoxide.

The reaction between the epoxide and the amine of formula (1) can be carried out either in the presence or absence of an inert solvent at temperatures between 50 and 200° C. It is conveniently carried out by heating the amine component to a temperature of from 70° and 170° C., slowly adding the epoxide component to it, and maintaining that temperature until the epoxy value is approximately zero.

Suitable monoepoxides (E) can be glycidyl esters or ethers.

Examples of glycidyl esters are glycidyl esters of $C_6$ to $C_{18}$ carboxylic acids. A particular glycidyl ester is a tertiary $C_9$-alkyl carboxylic acid glycidyl ester. Commercially available from Shell Chemicals under the Trademark Cardura E.

Examples of glycidyl ethers, are $C_4$ to $C_{16}$ alkyl glycidyl ethers or aryl glycidyl ethers. Examples of $C_4$ to $C_{16}$ alkyl glycidyl ethers are butyl glycidyl ether, hexyl glycidyl ether, and a mixture of $C_{12}$ and $C_{14}$ alkyl glycidyl ethers (commerically available from Proctor and Gamble under the trade mark Epoxide Number 8). Examples of suitable aryl glycidyl ethers include phenyl or $C_{1-6}$ alkyl phenyl glycidyl ethers.

Preferably the pendant group (E) is present in the polyoxyalkylene polyamine (C) when it is a triamine.

Reaction products of the invention containing no optional polyoxyalkylene polyamine C can be regarded as having an idealized structure:

A—B—D—B—A where A, B and D are as previously defined.

Where the reacton product includes a triamine (C) and a monoepoxide component (E) the resin is formulated as though it were a mixture of two resins having the idealised structures:

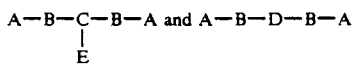

A—B—C—B—A and A—B—D—B—A
      |
      E

Although the reaction products have been discussed in terms of idealized structural formulae it will be appreciated that they will exist as complex mixtures.

The proportions of the reactants (A) to (E), are selected, taking into account their respective functionality such that the final reaction product is not gelled and is a liquid at temperatures above −5° C.

The amount of dialkanolamine (A) is optimised for maximum corrosion protection consistent with adequate emulsion stability.

The amount of any polyoxyalkylene polyamine (C) is optimised for maximum film flexibility and smoothness consistent with adequate emulsion stability and corrosion protection.

The amount of the product (D) is optimised for the desired pH of the final emulsion. The amount of any monoepoxide (E) is optimised for maximum emulsion stability consistent with adequate corrosion protection.

For example in practice the molar ratios of A:B:C:D:E will be in the range:

3–4:3–5:0.5–1.5:0.5–1.5:0.5–1

In the reaction mixture from which the amine epoxide reaction product is formed preferably there is an equimolar amount or an overall excess of total epoxy groups over the total amine groups, so that the formation of low molecular weight cationic species is minimised.

In particular the molar amount of amine should be 80–100% of the theoretical molar amount of epoxy and especially 90–95% assuming that each amine group on the polyoxyalkylene polyamine behaves as a monofunctional amine with respect to reaction with an epoxy group.

The non-gelled amine-epoxide reaction products are capable of forming acid addition salts with suitable salt-forming acids.

Thus the invention also provides an acid addition salt of a non-gelled amine epoxide reaction product as described above. Suitable acid addition salts are the hydrochlorides and the lactate salts, preferably the lactate salts.

The invention also provides a process for preparing a non-gelled amine epoxide reaction product as previously defined and its acid addition salt which comprises reacting any co-reactive components (A) to (E) in any order either simultaneously or sequentially where (A) to (E) are as previously defined with reference to the amine-epoxide reaction product, and optionally reacting the amine-epoxide reaction product so obtained with a salt forming acid to form an acid addition salt.

The sequence in which the components (A) to (E) can be reacted together can be varied. The co-reactants can be reacted in a single stage; or two or more of the co-reactants can be reacted in a first stage to give an intermediate product, followed by a further reaction stage or stages in which the remaining co-reactants are reacted with the preformed intermediate product.

When the monoepoxide (E) is to be present in the amine-epoxide reaction product, preferably at least a proportion of is reacted with the polyoxyalkylene polyamine first.

Preferably the effective amine functionality of this first polyoxyalkylene polyamine (C)-monoepoxide (E) intermediate product is not less than 1.5.

Preferably the polyoxyalkylene polyamine (C)-monoepoxide (E) intermediate product is reacted in a further single stage with the secondary amine (A), the product (D) and the polyepoxide (B).

Alternatively, the reaction with the polyepoxide and the secondary amine can be carried out in separate stages.

The components can be reacted together optionally in the presence of an inert solvent within a wide temperature range.

Inert solvents are those which do not react with any of the reagents or the products. Suitable inert solvents include ketones, esters and aromatic solvents.

Examples of ketones are methyl isobutyl ketone and methyl isoamyl ketone. Examples of esters are 'Cellosolve' acetate and ethyl butyl 'Cellosolve'. An example of an aromatic solvent is toluene.

The reaction can be carried out at temperatures of between 50° and 200° C. or preferably between 70 and 170° C.

The reaction is allowed to proceed until the epoxide value of the reaction mixture is of approximately zero.

Acid salts of the non-gelled amine-epoxide reaction products may be formed by neutralisation of the amine epoxide reaction product with a suitable salt forming acid.

The acid may be an inorganic acid or an organic acid. Examples of inorganic acids are phosphoric acid and hydrochloric acid. Examples of organic acids are carboxylic acids such as acetic and lactic acid.

Preferably the acid is lactic acid.

The acid addition salts of the amine epoxide reaction products described above are useful in forming aqueous dispersions.

The invention also provides an aqueous dispersion of an acid salt of a non-gelled amine-epoxide reaction product as described above.

Aqueous dispersions of an acid salt of the amine-epoxide reaction product may be prepared by adding water and a salt forming acid, to the amine-epoxide reaction product (optionally) in solution is a volatile organic liquid) and emulsifying under conditions of high shear in the example a "Silverson" high speed disperser, (Silverson is a Trademark).

Preferably any volatile solvent present during the amulsification process is then distilled off.

These aqueous dispersions are used to make coating compositions, by mixing them with crosslinking agents for the amine-epoxide reaction product.

Thus the present invention also provides a coating composition which comprises an aqueous dispersion of an acid salt of the amine-epoxide reaction product according to the invention and together a crosslinking agent.

Example of crosslinking agents are capped or blocked poly-isocyanates, b-hydroxyesters of the type described in EP 0 040 867, or phenolformaldehyde, melamine-formaldehyde, benzoguanamine-, formaldehyde glycoluril-formaldehyde, or ureaformaldehyde resins.

Preferably, the crosslinking agent is a blocked polyisocyanate.

Examples of polyisocyanates which may be blocked to form suitable crosslinking agents include the adducts of diisocyanates with polyols, and the buirets, isocyanurates and uretonamines formed by the self reaction of diisocyanates.

Suitable diisocyanates include toluene diisocyanate, hexamethylene diisocyanate, isophorone diisocyanate, tertramethyl xylene diisocyanate and diphenylmethane diisocyanate.

Preferred polyols are aliphatic triols such as trimethylol propane.

Examples of groups which may be used to block such isocyanates include aliphatic alcohols, glycol ethers, amides, lactams, amines oximes, and phenols. Such blocking groups are well known in the art and are selected such that with a particular isocyanate, the cross linker is stable in the presence of the amine-epoxy resin but is able to cross link a film of the resin deposited from aqueous dispersion at a suitable stoving temperature.

In addition to the amine-epoxide reaction product and any crosslinking agent the aqueous dispersions may also contain other organic film forming components. These further organic film forming components may be present to improve or modify the characteristics of a film formed from the coating composition. For example they can enhance film build, provide enhanced flexibility in the film, improve adhesion to a subsequently applied top-coat, minimise the formation of craters in any coating formed, or improve the throwing power when electrodepositing from an aqueous medium.

These further organic film forming components are preferably polymeric.

Examples of crater-reducing components are hydroxy functional acrylic polymers, particularly hydroxy functional acrylic polymers especially copolymers of butyl acrylate and hydroxyethyl acrylate.

Examples of adhesion-improving components include certain melamine formaldehyde resins, which are highly alkylated highly methylolated melamine formaldehydes described in Published European Patent Application EP. A-229459.

There may also be present in the above coating composition other conventional components such as pigments, pigment dispersants, fillers, plasticisers such as polycaprolactones or polyethers, coalescing solvents such as phenoxy propanol, surfactants or catalysts.

The coating composition is particularly suitable for application to a conductive substrate by cathodic electrodeposition.

Thus the invention also provides a process of coating by electrodeposition which comprises passing an electric current between a conductive substrate immersed as a cathode in a composition according to the invention and a counter-electrode as an anode.

The process can be carried out under standard conditions of current density, potential, and time.

The electrodeposition process is conveniently carried out at a current density of 0.1 to 10 milliamps $cm^{-2}$ of the surface area of the substrate and at a voltage of 200 to 500 volts.

The deposition process is typically carried out at a temperature of between 10° and 40° C., usually 20° to 35° C.

In practice the deposition process is carried on for 1 to 3 minutes.

After the deposition step has been completed, the substrate is removed, rinsed with demineralised water and stoved to ensure that the reaction between the crosslinker and film-former proceeds to completion. Typically the stoving step is carried out at 100° to 190° C. for 15 to 30 minutes.

The following Examples 1 to 5 illustrate the invention. Examples A to H are comparative.

EXAMPLES

Examples 1 to 6 are according to the invention while examples A to H are comparative examples.

EXAMPLE 1 a) Preparation of Capped Chain Extended Epoxy

Araldite GY 2600 (1520.0 g) (polyepoxide from Ciba Geigy, epoxy equivalent weight = 190), Bisphenol A (456.0 g), nonyl phenol (110.0 g), and toluene (146.0 g) were charged to a flask fitted with a stirrer, a thermometer, and a Dean and Stark water separator. The mixture was heated to reflux temperature and any water present was removed. After cooling to 110° C., triphenylethyl phosphonium iodide (1.52 g) was added to the mixture and the temperature was raised to 130° C. The temperature rose by exotherm to 190° C. The mixture was allowed to cool and the temperature was then held at 150° C. until the product had an epoxide value of 1.567 mmolg. Methyl isobutyl ketone (374.0 g) was added slowly to the mixture giving a final epoxide value of 1.342 mmolg$^{-1}$ and non volatile content of 80%.

b) Preparation of Polyoxalkylene polyamine Monoepoxide Adduct

"Cardura" E, (glycidyl ester of a $C_8$ tertiary alkyl carboxylic acid, Shell Chemicals) (1250.0 g), was added to a reaction flask containing Jeffamine T403 (2200.0 g), (Polyoxy-propylene triamine of structure:

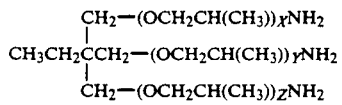

$X+Y+Z$=approximately 5.3, and the approximate average molecular weight =440).

The flask was fitted with a stirrer and thermometer, and a nitrogen blanket was applied. The mixture was heated to 110° C. when an exotherm set in which raised the temperature to 160° C. The mixture was maintained at 140° C. for 1 hour after which the product had an epoxide value of zero and an amine value of 4.348 mmolg$^{-1}$. Methyl isobutyl ketone (609.0 g) was added slowly to the mixture which had a final amine value of 3.696 mmolg$^{-1}$.

c) Preparation of Isocyanate Crosslinker

Toluene diisocyanate (522.0 g) was charged to a flask fitted with a stirrer, thermometer, dropping funnel and nitrogen blanket. Butoxyethoxyethanol (486.0 g) was added via the dropping funnel over 3 hours and the temperature of the mixture was allowed to rise to 70° C. This temperature was held until the free isocyanate value was 12.5%.

Dibutyl tin dilaurate (0.16 g) was added followed by trimethylolpropane (134.0 g) over 2 hours allowing the temperature to rise to 120° C. This temperature was held until the free isocyanate value was zero. Butanol (10.0 g) was added to the mixture followed by methyl isobutyl ketone (381.0 g). The final solids content was 75%.

d) Preparation of Anticrater Aqent

Methyl isobutyl ketone (2440.0 g) was charged to a reaction flask fitted with a stirrer, thermometer and nitrogen blanket. The temperature was raised to reflux temperature, then the monomer mixture; butyl acrylate (5200.0 g) and hydroxy ethyl acrylate (1730.0 g), and the initiator mixture; 2,2 azobis (2-methyl butyronitrile) ('Genitron AZM') (70.0 g) and methyl isobutyl ketone (500.0 g), were added over 3 hours.

The mixture was held at reflux temperature for 1 hour after which t-butyl peroxy-2-ethyl hexanoate (10.0 g) and methyl isobutyl ketone (50.0 g) were added. Reflux temperature was maintained for a further 1 hour, to give a product of 70.0% solids, and with a viscosity of 5-7 sec/BT/25° C.

e) Preparation of Pigment Dispersant

Araldite GY 2600 (1512.0 g), bisphenol A (456.0 g) and toluene (127.9 g) were charged to a flask fitted with a stirrer, thermometer, and Dean and Stark separator. The mixture was heated to reflux temperature, and any water present was removed. After cooling to 120° C., triphenylethyl phosphonium iodide (1.51 g) was added to the mixture and the temperature was raised to 140° C. The temperature spontaneously rose by exotherm to 181° C. The temperature was held at 180° C. until the mixture had an epoxide value of 1.908 mmolg$^{-1}$.

The mixture was cooled to 125° C. and Dowanol DPM (dipropylene glycol methyl ether) (563.8 g) added slowly. The temperature was reduced to 100° C. and n-methyl ethanolamine (75.0 g) and Jeffamine D400 (800.0 g) were added to the mixture. Dowanol DPM (40.0 g) was added. The temperature rose by exotherm to 115° C. "Cardura" E (250.0 g) followed by Dowanol DPM (40.0 g) was added and the temperature rose by exotherm to 127° C. The temperature was maintained until the epoxide value was zero and the amine value was 1.292 mmolg$^{-1}$. After cooling to 95° C., lactic acid, 80% (aq) (562.0 g) was added to the mixture and the temperature was held at 95° C. for a further 30 minutes.

The above mixture (4207.0 g) was then added slowly to a churn containing demineralised water (2470.3 ). After stirring for 15 minutes further demineralised water (1717.0 g) was added. A further addition of demineralised water (508.07 g) gave a final product with viscosity of 15–20 poise (125° C./Cone+Plate) and non volatile content of 33.0%.

f) Preparation of Aqueous Pigment Millbase

Pigment dispersant from (e) above (13,706.2 g), was charged to a 'NETZSCH' bead mill premix vessel and stirred at 500 rpm. Lactic acid (80% aq) (78.63 g) was added followed by China Clay Supreme (2721.41 g), carbon black (54.39 g), basic lead silicate (253.978 g), dibutyl tin oxide catalyst (280.11 g) and titanium dioxide (2835.87 g).

This mixture was mixed at 2000 rpm for 30 minutes to give a viscosity of 7.3 poise/Rotothinner/25.0° C.

The mixture was passed through the NETZSCH bead mill to give a fineness of 15–20 microns at 13.5 minutes per litre, and 49° C. A second pass through the bead mill at a rate of 12.5 minutes per litre at 50° C. gave a final fineness of 10 microns.

The solids content of the batch was checked and adjusted to 52.93% by the addition of demineralised water.

g) Preparation of Coating Composition 1

(i) Preparation of Amine-bis Epoxy Adduct 1

Dimethyl amino propylamine (224.0 g) was charged to a reaction flask fitted with a stirrer and a thermometer. The temperature was raised to 85° C. Dow epoxy resin, XU.71832 (EEW =342.3) (low chlorine content epoxy), (684.6 g) was added slowly to the flask over 20 minutes to avoid excessive exotherm. A maximum exotherm temperature of 139.0° C. was achieved. A temperature of 130° C. was maintained for 1 hour when the epoxide value had reached zero, and the amine value, 4.5 mmolg$^{-1}$. The batch was cooled, then thinned with toluene (156.8 g) to give a product with an 85% non volatile content and amine value of 3 826 mmolg$^{-1}$.

(ii) Preparation of Emulsion 1

The capped chain extended epoxy from (a) above (533.68 g), and Desmophen 900 U (a polyether from Bayer Chemicals 80.84 g) were charged to a flask fitted with a stirrer, thermometer and condenser. The temperature was raised to 90° C. Diethanolamine (31.50 g), amine-bis epoxy adduct from 1(g)(i) above (94.10 g) and the amine-monoepoxide adduct from 1(b) above (73.06 g) were mixed together then added to the reaction flask over 2 minutes. Methyl isobutyl ketone (30.0 g) was used to rinse the premix vessel, and was added to the reaction mixture. The temperature rose by exotherm to a maximum of 110° C. The temperature was raised to 125° C. and held until the epoxy value reached zero and the amine value was 1.103 mmolg$^{-1}$. The temperature was held for a further 1 hour after which the mixture was allowed to cool to 90° C. and the isocyanate crosslinker from 1(c) above (538.92 g) was added.

Cymel 1156 (a highly butylated melamine formaldehyde resin, 34.65g) and the anti-crater agent from 1(d) above (49.50 g) were premixed and then added to the reaction mixture Methylisobutyl ketone (15.0 g) was again used to rinse the premix vessel then added to the mixture. Lactic acid 80% (33.98 g) was added and the mixture stirred for 10 minutes.

The above product (1354.1 lg) was emulsified using a high speed 'Silverson' disperser with demineralised water (2167.2 g). The volatile solvents were removed from the emulsion by distillation.

(iii) Preparation of Coating Composition

Emulsion 1 from 1(g)(ii) above (2091.5 g), demineralised water (2145.0 g) and pigment millbase from 1(f) above (563.5 g) were mixed together to give a composition of 0.2/1.0 (pigment/binder) and a total solids content of 21.5%.

This was stirred for 24 hours before deposition.

2. Preparation of Coating Composition 2

(a) Preparation of Amine-bis Epoxy Adduct 2

Dimethyl amino propylamine (204.0 g) was charged to a reaction flask fitted with a stirrer and thermometer. The temperature was raised to 80° C. Hexane diol diglycidyl ether (EEW=145.5), (291.0 g) was added very slowly to the flask over 30 minutes. A maximum exotherm temperature of 160° C. was achieved. A temperature of 130° C. was maintained for 1 hour when the epoxide value had reached zero and the amine value 8.081 mmolg$^{-1}$. The batch was cooled then thinned with toluene (87.4 g) to give a product with an 85% non volatile content and an amine value of 6.868 mmolg$^{-1}$.

(b) Preparation of Emulsion 2

The capped chain extended epoxy from 1(a) above (533.68 g) and Desmophen 900U (76.07 g) were charged to a flask fitted with a stirrer, thermometer and condenser. The temperature was raised to 90° C. Diethanolamine (31.50 g), the amine-bis epoxy adduct from 2(a) above (52.42 g) and the amine-monoepoxide adduct from 1(b) above (73.06g) were mixed together then added to the reaction flask over 2 minutes. Methyl isobutyl ketone (30.0g) was used to rinse the premix vessel, then added to the reaction mixture. The temperature rose by exotherm to a maximum of 113.0° C. The temperature was then raised to 125° C. and held until the epoxide value had reached zero and the amine value, 1.167mmolg$^{-1}$.

Isocyanate crosslinker from 1(c) above (507.13 g) was added and the temperature held for a further 1 hour, after which the mixture was allowed to cool to 90° C.

Cymel 1156 (32.60 g) and anticrater agent from 1(d) above (46.57 g) were premixed and added to the reaction mixture. Methyl isobutyl ketone (15.0 g) was used to rinse the premix vessel and then added to the mixture.

After cooling, lactic acid (80%) (36.67 g) was added and the mixture allowed to stir for 10 minutes.

The above product (1195.4 g) was emulsified with demineralised water (1904.3 g) using a Silverson disperser. The volatile solvents were removed from the emulsion by distillation.

The final product had a non-volatile content of 33.79%.

(c) Preparation of Coating Composition 2

Emulsion 2 from 2(b) above (2176.5 g), demineralised water (2060.0 g) and pigment millbase, from 1(f) above (563.5 g) were mixed together to give a composition of 0.2/1.0 (pigment/binder) and a total solids content of 21.5%.

This was stirred for 24 hours before deposition.

3. Preparation of Coating Composition 3

(a) Preparation of Amine-bis Epoxy Adduct 3

Dimethyl amino propylamine (204.0 g) was charged to a flask fitted with a stirrer and thermometer. The temperature was raised to 80° C. Polytetra hydrofuran diglycidyl ether (EEW=413), (826.0 g) was added slowly to the flask. A maximum exotherm temperature of 120° C. was reached. A temperature of 130° C. was maintained for 1 hour when the epoxide value had reached zero and the amine value was 3.883 mmolg$^{-1}$. The mixture was cooled and toluene (181.76 g) was added to give a product of 85% non volatile content and with an amine value of 3.301 mmolg$^{-1}$.

(b) Preparation of Emulsion 3

The capped chain extended epoxy from 1(a) above (533.68 g) and Desmophen 900U (82.55 g) were charged to a flask fitted with a stirrer, thermometer and condenser. The temperature was raised to 90° C. Diethanolamine (31.50 g), the amine-bis epoxy adduct from 3(a) above, (109.06 g) and the amine monoepoxide adduct from 1(b) above (73.06 g) were mixed together and added to the reaction flask over 2 minutes. Methyl isobutyl ketone (30.0 g) was used to rinse the premix vessel and was added to the mixture. The temperature rose by exotherm to a maximum of 116° C. The temperature was then raised to 125° C. and maintained until the epoxide value reached zero and amine value 1.082 mmolg$^{-1}$.

The isocyanate crosslinker from 1(c) above (550.35 g) was added and the temperature held for a further 1 hour after which the temperature was reduced to 90° C.

Cymel 1156 (35.38 g) and the anticrater agent from 1(d) above (50.54 g) were premixed then added to the reaction mixture. Methyl isobutyl ketone (15.0 g) was again used to rinse the premix vessel and then added to the mixture.

After cooling further, lactic acid (80% aq) (39.80 g) was added and the mixture was stirred for 10 minutes.

The above product (1405.5 g) was emulsified with demineralised water (2254.5 g) using a Silverson disperser. The volatile solvents were removed by distillation.

The final product had a non-volatile content of 37.48%.

(c) Preparation of Coating Composition 3

Emulsion 3 from 3(b) above (1962.0 g), demineralised water (2274.5 g) and pigment millbase, from 1(f) above (563.5 g) were mixed together to give a composition of 0.2/1.0 (pigment/binder) and a total solids content of 21.5%.

This was stirred for 24 hours before deposition.

4. Preparation of Coating Composition 4

(a) Amine-Epoxy Adduct 4

Jeffamine T403 (220.0 g) was charged to a flask fitted with a stirrer and thermometer. The temperature was raised to 90° C., Cardura E (125.0 g) was added and the mixture allowed to exotherm to 150° C., this temperature was maintained until epoxide value was zero and amine value was 4.35 mmolg$^{-1}$. The batch was cooled to 100° C., dimethyl amino propylamine (102.0 g) was added, the batch cooled further and 'Ciba Geigy Epoxy XB4122 (epoxy equivalent weight = 339) (339.0 g) was added over 20 mins. A maximum exotherm of 112° C. was observed.

A temperature of 130° C. was then maintained for a further 1 hour. Until the epoxide value was zero and the amine value was 4.45 mmolg$^{-1}$.

Toluene (138.7 g) was added to give a product with an amine value of 3.785 mmolg and non volatile contents of 85%.

(b) Preparation of Emulsion 4

The capped chain extended epoxy from 1(a) above (533.68 g) and Desmophen 900U (80.76 g) were charged to a flask fitted with a stirrer and thermometer. The temperature was raised to 90° C.

Diethanolamine (31.5 g) and the amine-epoxy adduct from 4(a) above (166.44 g) were mixed together, then added to the reaction flask over 2 minutes. Methyl isobutyl ketone (30.0 g) was added. The temperature rose by exotherm to a maximum of 112° C. The temperature was then increased to 125° C. and maintained for 1 hour until the epoxide value was zero.

The isocyanate crosslinker from 1(c) above (538.4 g) was added and the temperature held at 125° C. for a further 1 hour.

The mixture was cooled to approximately 80° C., Cymel 1156 (34.6 g) and the anticrater agent from 1(d) above (49.4 g) were added, followed by methyl isobutyl ketone (15.0 g) and lactic acid (80% aq), (38.94 g). The mixture was stirred for 10 minutes.

The above product (1404.5 g) was emulsified with demineralised water (2247.74 g) using a Silverson disperser. The volatile solvents were removed from the emulsion by distillation.

The final product had a non volatile content of 36.15%.

Preparation of Coating composition 4

Emulsion 4 from 4(b) above (2034.3 g), demineralised water (2202.2 g) and pigment millbase from 1(f) above (563.5 g) were mixed together giving a composition of pigment; binder ratio of 0.2:1.0 and a total solids content of 21.5%.

This was stirred for 24 hours before deposition.

5. Preparation of Coating Composition 5

(a) Preparation of Amine-bis Epoxy Adduct 5

Diethyl amino propylamine (260.4 g) was charged to a reaction flask fitted with a stirrer and thermometer. The temp was raised to 80° C., Dow epoxy resin, XU 71832 (EEW=342.3) (684.6 g) was added over 15 minutes to the flask. The temperature rose by exotherm to a maximum of 110° C. The temperature was raised to 130° C. and maintained for 1 hour until epoxide value was zero and amine value was 4.23 mmolg$^{-1}$. The mixture was cooled and toluene (166.76 g) was added to give a product with 85% non volatile content and amine value of 3.598 mmolg$^{-1}$.

(b) Preparation of Emulsion 5

The capped chain extended epoxy from 1(a) above (533.68 g) and Desmophen 900U (81.52 g) were charged to a flask fitted with a stirrer and thermometer. The temperature was raised to 90° C.

Diethanolamine (31.50 g), amine-bis epoxy adduct 5 from 5(a) above (100.06 g) and the amine-monoepoxide adduct from 1(b) above (73.06 g), were mixed together and added to the reaction flask over 2 minutes.

Methyl isobutyl ketone (30.0 g) was used to rinse the premix vessel, and was added to the mixture. The temperature rose by exotherm to a maximum of 103° C. The temperature was then raised to 125° C. and maintained until the epoxide value reached zero and amine value 1.094 mmolg$^{-1}$.

The isocyanate crosslinker from 1(c) above (543.48 g) was added and the temperature held for a further 1 hour. The mixture was cooled to 90° C. Cymel 1156 (34.94 g) and the anticrater agent from 1(d) above (49.91 g) were premixed then added to the reaction mixture. Methyl isobutyl ketone (15.0 g) was again used to rinse the premix vessel and was added to the mixture.

After cooling further, lactic acid (80% aq), (39.31 g) was added and the mixture was stirred for 10 minutes.

The above product (1412.0 g) was emulsfied with demineralised water (2261.4 g) using a Silverson disperser. The volatile solvents were removed by distillation.

The final product had a non volatile content of 37.71%.

(c) Preparation of Coating Composition 5

Emulsion 5 from 5(b) above (1950.0 g), demineralised water (2236.5 g) and pigment millbase from 1(f) above (563.5 g) were mixed together to give a composition of 0.2:1.0 (pigment/binder ratio) and a total solids content of 21.5%.

This was stirred for 24 hours before deposition.

CONSTRUCTIVE EXAMPLE 6

An amine epoxide reaction product according to the invention can be made by the following method:

a) Preparation of Chain Extended Epoxy

Araldite GY 2600 (1520.0 g) (polyepoxide from Ciba Geigy, epoxy equivalent weight =190), Bisphenol A (456.0 g), and toluene (146.0 g) are charged to a flask fitted with a stirrer, a thermometer, and a Dean and Stark water separator. The mixture is heated to reflux temperature and any water present is removed. After cooling to 110° C., triphenylethyl phosphonium iodide (1.52 g) is added to the mixture and the temperature is raised to 130° c. The temperature is then held at 150° C. until the product had an epoxide value of about 1.85 mmolg-1. Methyl isobutyl ketone (374.0 g) is added slowly to the mixture.

b) Preparation of Emulsion

The Chain Extended Epoxy from Example 1 (a) above (1976 g non volatile) and Desmophen 900U (a polyether from Bayer Chemicals, 80.84 g) are charged to a flask fitted with a stirrer, thermometer and condenser. The temperature is raised to 90° C. Diethanolamine (210 g) and the amine bis-epoxy adduct from Example (1) (g) (i) above (1132 g non volatile) are mixed together and then added to the reaction flask over 2 minutes. Methyl isobutyl ketone (30.0 g) is used to rinse the premix vessel, and is added to the reaction mixture. The temperature is raised to 125° C. and held until the epoxy valve reaches zero. The temperature is held for a further 1 hour after which the mixture is allowed to cool to 90° C. and the isocyanate crosslinker from 1 (c) above (538.9 g) is added.

Cymel 1156 (a highly butylated melamine formaldehyde resin, 34.65 g) and the anti-crater agent from Example 1 (d) above (49.5 g) are premixed and added to the reaction mixture. Methylisobutyl ketone (15.0 g) is again used to rinse the premix vessel and is then added to the mixture. Lactic acid 80% (33.98) is added and the mixture is stirred for 10 minutes.

The above product (1354.1 g) is emulsified using a highspeed "Silverson" disperser with demineralised water (2145. og). The volatile solvents are removed from the emulsion by distillation.

COMPARATIVE EXAMPLES

Comparative examples A, B, and C show compositions whose amine component of the adduct (D) does not correspond to formula (1).

A. Preparation of Coating Composition A (i) Preparation of Amine-bis Epoxy Adduct A Ethanolamine (122.0 g) was charged to a flask fitted with a stirrer and thermometer. The temperature was raised to 80° C. Dow epoxy resin, XU71832 (EEW=342.3), (684.6 g) was added to the flask over 25 minutes. A maximum exotherm temperature of 117° C. was achieved. The temperature was raised to 130° C. and maintained for 1 hour until epoxide value reached zero and amine value was 2.48 mmolg$^{-1}$. The mixture was cooled and toluene (142.3 g) to was added give a product with 85% non volatile content and amine value of 2.108 mmolg$^{-1}$.

(ii) Preparation of Emulsion A

The capped chain extended epoxy from 1(a) above (533.68 g) and Desmophen 900U (79.84 g) were charged to a flask fitted with a stirrer, thermometer and condenser. The temperature was raised to 90° C.

Diethanolamine (31.50 g), amine-bis epoxy adduct A from A(i) above (85.40 g) and the amine monoepoxide adduct from 1(b) above (73.06 g) were mixed together and added to the reaction flask over 2 minutes. Methylisobutyl ketone (30.0 g) was used to rinse the premix vessel then added to the mixture. The temperature rose by exotherm to a maximum of 96° C. The temperature was then raised to 125° C. and maintained until the epoxy value had reached zero and the amine value, 0.899 mmolg$^{-1}$.

The isocyanate crosslinker from 1(c) above (532.29 g) was added and the temperature held at 125° C. for a further 1 hour.

The mixture was cooled to approx. 90° C., Cymel 1156 (34.22 g) and the anticrater agent from 1(d) above (48.89 g) were premixed and then added to the flask. Methyl isobutyl ketone (15.0 g) was again used to rinse the premix vessel and added to the flask.

After cooling further, lactic acid (80%), (38.50 g) was added and the mixture allowed to stir for 10 minutes.

The above product (1381.3 g) was emulsified with demineralised water (2208.8 g) using a 'Silverson' high speed disperser. The volatile solvents were removed from the emulsion by distillation.

The final product had a non volatile content of 36.06%.

(iii) Preparation of Coating Composition A

Emulsion A from A(ii) above (2039.5 g), demineralised water (2197.0 g) and pigment millbase from 1(f) above (563.5 g) were mixed together to give a composition of 0.2/1.0 (pigment/binder) and a total solids content of 21.5%.

This was stirred for 24 hours before deposition.

B. Preparation of Coating Composition B (i) Preparation of Amine-Epoxy Adduct B Amino ethyl morpholine (50.38 g) was charged to a flask fitted with a stirrer and thermometer. The temperature was raised to 80° C. Dow epoxy resin, XU71832 (EEW=342.3), (132.65 g) was added over 10 minutes to the flask. The temperature rose by exotherm to a maximum of 138° C. The temperature was then reduced to 130° C. and maintained until epoxy value had reached zero and amine value, 4.235 mmolg$^{-1}$. The mixture was cooled and toluene (32.30 g) was added giving a final product of 85% non volatile content and with an amine value of 3.600 mmolg$^{-1}$.

(ii) Preparation of Emulsion B

The capped chain extended epoxy from 1(a) above (533.68 g) and Desmophen 900U (81.52 g) were charged to a flask fitted with a stirrer, thermometer and condenser. The temperature was raised to 90° C.

Diethanolamine (31.50 g), amine epoxy adduct B from B(i) above (100.02 g) and the amine monoepoxide adduct from 1(b) above (73.06 g), were mixed together then added to the reaction flask over 2 minutes. Methyl isobutyl ketone (30.0 g) was used to rinse the premix vessel then added to the mixture. The temperature rose by exotherm to a maximum of 118° C. The temperature was then raised to 125° C. and maintained until the epoxy value reacted zero and amine value, 1.094 mmolg$^{-1}$.

The isocyanate crosslinker from 1(c) above (543.33 g) was added and the temperature held a 125° C. for a further 1 hour after which the mixture was cooled to 90° C.

Cymel 1156 (34.94 g) and the anticrater agent from 1(d) above (49.91 g) were mixed together and added to the mixture. Methyl isobutyl ketone (15.0 g) was used to rinse the premix vessel and added to the flask. After further cooling, lactic acid (80%), (39.30 g) was added and the mixture allowed to stir for 10 minutes.

The above product (1397.3 g) was emulsified with demineralised water (2238.07 g) using a 'Silverson' high speed disperser. The volatile solvents were removed from the emulsion by distillation.

The final product had a non volatile content of 38.68%.

(iii) Preparation of Coating Composition B

Emulsion B from B(ii) above (1901.25 g) demineralised water (2335.25 g) and pigment millbase, from 1(f) above (563.5 g) were mixed together to give a composition of 0.2/1.0 (pigment/binder ratio) and a total solids content of 21.5%.

This was stirred for 24 hours before deposition.

C. Preparation of Coating Composition C

(i) Preparation of Amine-epoxy Adduct C $C_{13}/C_{15}$ alkyl amine, (commercially available as 'Symprolam 35' from ICI) (414.8 g) was charged to a flask fitted with a stirrer and thermometer. The temperature was raised to 80° C. Dow epoxy resin, XU71832 (EEW=342.3), (684.6 g) was added to the flask over 20 minutes, a maximum exotherm temperature of 106° C. was achieved. The temperature was then raised to 130° C. and maintained until epoxide value reached zero and amine value, 1.819 mmolg$^{-1}$. The mixture was cooled and toluene (194.0 g) was added to give a product at 85% non volatile content and with an amine value, 1.546 mmolg$^{-1}$.

(ii) Preparation of Emulsion C

The capped chain extended epoxy from 1(a) above (533.68 g) and Desmophen 900U (83.44 g) were charged to a flask fitted with a stirrer thermometer and a condenser. The temperature was raised to 90° C.

Diethanolamine (31.50 g), amine epoxy adduct C from C(i) above (116.83 g) and the amine monoepoxide adduct from 1(b) above (73.06 g) were mixed together then added to the reaction flask over 2 minutes. Methyl isobutyl ketone (30.0 g) was used to rinse the premix vessel then added to the reaction mixture The temperature rose by exotherm to a maximum of 125° C. This temperature was maintained until the epoxy value had reached zero and amine value, 0.864 mmolg$^{-1}$.

The isocyanate crosslinker from 1(c) above (556.28 g) was added and the temperature held at 125° C. for a further 1 hour after which it was reduced to 90° C.

Cymel 1156 (35.76 g) and the anticrater agent from 1(d) above (51.09 g) were premixed and then added to the mixture Methyl isobutyl ketone (15.0 g) was used to rinse the premix vessel then added to the flask.

After cooling further, lactic acid, 80% (40.23 g) was added and the mixture allowed to stir for 10 minutes.

The above product (1417.5 g) was emulsified with demineralised water (2274.1 g) using a 'Silverson' high speed disperser. The volatile solvents were removed from the mixture by distillation.

The final product had a non volatile content of 37.81%.

(iii) Preparation of Coating Composition C

Emulsion C from C(ii) above (1945.0 g) demineralised water (2291.5 g) and pigment millbase from 1(f) above (563.5 g) were mixed together to give a composition of 0.2/1.0 (pigment/binder) and a total solids content of 21.5%.

This was stirred for 24 hours before deposition.

D. Example D

This example is according to example 13 of EP2003-97A.

(i) Preparation of ¼ Capped Chain extended Epoxy Resin

Araldite GY 2600 (1504.0 g) (EEW =188) bisphenol A (456.0 g), nonyl phenol (220.0 g) and toluene (164.0 g) were charged to a flask fitted with a stirrer thermometer condenser and a Dean & Stark water separator. The mixture was heated to reflux temperature and any water present was removed. After cooling to 100° C. Triphenyl ethyl phosphonium iodide (1.5 g) was added to the mixture and the temperature raised to 130° C. The temperature rose by exotherm to 182° C., then was held at 180° C. until the product had an epoxide value of 1.279 mmolg$^{-1}$. Methyl isobutyl ketone was then added, giving a final epoxide value of 1.101 mmolg$^{-1}$ and non volatile content of 80%.

(ii) Preparation of Pigment Dispersant

Araldite GY 2600 (1512.0 g), (EEW 189) and Bisphenol A (456.0 g) were charged to a reaction flask fitted with a stirrer, thermometer and condenser. Triphenylethyl phosphonium iodide (1.50 g) was added and the temperature raised to 130° C. The temperature rose by exotherm to a maximum of 176° C. The temperature was raised to 180° C, and held until the product had an epoxide value of 2.03 mmolg$^{-1}$. After cooling to 110° C, Dowanol DPM (2646.0g) was added to the mixture. The temperature was reduced further to 100° C. and N-methyl ethanolamine (75.0 g) immediately followed by Jeffamine D400 (800.0 g) were added to the mixture. Dowanol DPM (27.0 g) was then added and the mixture exothermed to 115° C. "Cardura" E (250.0 g) followed by Dowanol DPM (27.0 g) were added, temperature rose by exotherm 123° C. The temperature was held between 120°-125° C., until the epoxide value reached zero and amine value was 0.863 mmolg$^{-1}$. After cooling to 90° C., lactic acid 80% (aq) (394.2 g) was added and the temperature held for a futher 30 minutes, after which it was allowed to cool. Final non volatile content was 52.0%.

(iii) Preparation of Aqueous Pigment Millbase

Pigment dispersant from (ii) above (6680.0 g) was charged to a premix vessel containing demineralised water (5472.0 g) and lactic acid 80% (aq) (204.0 g). A mixture of china clay supreme (2564.0 g), carbon black (52.0 g), basic lead silicate (160.0 g), dibutyl tin oxide (176.0 g) and titanium dioxide (2672.0 g) was added to the premix vessel and mixed at 2000 rpm for 30 minutes.

The mixture was passed through the NETZSCH bead mill twice to give a fineness of 10 microns. The solids content of the batch was checked and readjusted to 45.5%, with demineralised water. The final viscosity was 2.5 poise/Rotothinner/25° C.

(iv) Preparation of Comparative Coating Composition D

(a) Preparation of Emulsion D

The capped chain extended epoxy from D(i) above (544.8 g) was charged to a flask fitted with a stirrer, thermometer and condenser, and temperature raised to 90° C. A mixture of 'Jeffamine'0 T403 (88.0 g), N-methyl ethanolamine (15.0 g) and 'Cardura E' (25.0 g) was added to the flask and the temperature rose by exotherm to a maximum of 101° C., after which it was raised to 115° C. and maintained until the epoxide value had reached zero and amine value 1.043 mmolg$^{-1}$. Methyl isobutyl ketone (89.14 g) was added to give a final non volatile content of 74%.

Reaction product from above (700.0 g) was blended with the isocyanate crosslinker from 1(c) (340.0 g), phenoxypropanol (20.0 g) and lactic acid (80% aq) (32.0 g) then dispersed on a 'Silverson' emulsifier with demineralised water (1200.0 g). The volatile solvents were removed from the emulsion by distillation. The resulting product had a non volatile content of 36.10%.

(b) Preparation of Coating Composition D

Emulsion D from D(iv) above (1916.0 g) demineralised water (1938.2 g) and pigment millbase from D(iii) above (562.8 g) were mixed together to give a composition of 0.25/1.00 (pigment/binder ratio) and a total solids content of 21.5%.

This was stirred for a minimum of 24 hours.

E. Preparation of Comparative Coating Composition E a) Preparation of Emulsion E

The capped chain extended epoxy from D(i) above (544.8 g) and Desmophen 900U (75.9 g) were charged to a reaction flask fitted with a stirrer, thermometer and condenser. The temperature was raised to 90° C.

N-Methylethanolamine (15.0 g), the amine monoepoxide adduct from 1(b) above (81.18 g) and Jeffamine T403 (44.0 g) were mixed together then added to the flask over 2 minutes. Methyl isobutyl ketone (30.0 g) was added. A maximum exotherm temperature of 102° C. was observed. The temperature was then raised to 125° C. and maintained until the epoxy value reached zero and amine value, 1.012 mmolg$^{-1}$.

The isocyanate crosslinker from 1(c) above (506.01 g) was added and the temperature held at 125° C. for a further 1 hour after which it was reduced to 90° C. Cymel 1156 (32.53 g) and the anti crater agent from 1(d) above (46.47 g) were premixed and then added to the mixture.

After cooling further, lactic acid (80%) (45.74 g) was added and the mixture stirred for 10 minutes.

The above product (1374.0 g) was emulsified using a high speed 'Silverson' disperser with demineralised water (2237.2 g). The volatile solvents were removed from the emulsion by distillation.

The final product had a non-volatile content of 38.93%.

(ii) Preparation of Coating Composition E

Emulsion E from E(i) above (1888.9 g) demineralised water (2347.6 g) pigment millbase, from 1(f) above (563.5 g) were mixed together to give a composition of 0.2/1.0 (pigment binder ratio) and a total solids content of 21.5%.

This was stirred for 24 hours.

F. Preparation of Coating composition F

(i) Preparation of Emulsion F

The capped chain extended epoxy from D(i) above (544.8 g) and Desmophen 900U (71.35 g) were charged to a reaction flask fitted with a stirrer, thermometer and condenser. The temperature was raised to 90° C.

N-methyl ethanolamine (15.0 g), the amine mono epoxide adduct from 1(b) above (81.18 g) and dimethyl amino propylamine (10.2 g) were mixed together, then added to the reaction flask over 2 minutes. Methyl isobutyl ketone (30.0 g) was used to rinse the premix vessel, then added to the reaction mixture.

The temperature rose by exotherm to a maximum of 106° C. The temperature was then raised to 125° C. and held until the epoxy value reached zero and amine value 0.930 mmolg$^{-1}$.

The isocyanate crosslinker from 1(c) above (475.68 g) was added and the temperature held at 125° C. for a further 1 hour.

The mixture was cooled to approximately 90° C., Cymel 1156 (30.58 g), and the anti-crater agent from (d) above (43.69 g) were premixed then added to the reaction vessel.

After further cooling, lactic acid (80% aq) (43.0 g) was added and the mixture allowed to stir for 10 minutes.

The above product (1230 g) was emulsified with demineralised water (1980.9 g) using a 'Silverson' high speed disperser. The volatile solvents were removed from the emulsion by distillation.

The final product had a non volatile content of 5.38%.

(ii) Preparation of Coating Composition F

Emulsion F from F(i) above (2078.5 g), demineralised water (2158.1 g) and pigment millbase, from 1(f) above (563.5 g) were mixed together to give a composition of 0.2/1.0 (pigment/binder ratio) and a total solids content of 21.5%.

This was stirred for 24 hours before deposition.

G. Preparation of Coating Composition G

(i) Preparation of Emulsion G

The capped chain extended epoxy from D(i) above (544.8 g) and Desmophen 900U (72.16 g) were charged to a reaction flask fitted with a stirrer, thermometer and condenser. The temperature was raised to 90° C.

Diethanolamine (21.0 g), the amine monoepoxide adduct from 1(b) above (81.18 g) and dimethylamino propylamine (10.2 g) were mixed together, then added to the reaction flask over 2 minutes. Methyl isobutyl ketone (30.0 g) was used to rinse the premix vessel then added to the reaction mixture. A maximum exotherm temperature of 125° C. was achieved, this was then maintained until the epoxy value reached zero and amine value 0.922 mmolg$^{-1}$.

The isocyanate crosslinker from 1(c) above (481.07 g) was added and the temperature held at 125° C. for a further 1 hour.

The mixture was cooled to approximately 90° C., Cymel 1156 (30.93 g) and the anti crater agent from 1(d) above (44.19 g) were premixed then added to the reaction vessel.

After further cooling, lactic acid (80% aq) (43.49 g) was added and the mixture stirred for 10 minutes.

The above product (1280 g) was emulsified with demineralised water (2065.6 g) using a 'Silverson' high speed disperser. The volatile solvents were removed from the emulsion by distillation.

The final product had a non volatile content of 33.97%.

(ii) Preparation of Coating Composition G

Emulsion G from G(i) above (2164.7 g) demineralised water (2071.8 g) and pigment millbase, from 1(f) above (563.5 g) were mixed together to give a composition of 0.2/1.0 (pigment/binder ratio) and a total solids content of 21.5%.

This was stirred for 24 hours before deposition

H. Preparation of Coating Composition H

(i) Preparation of Emulsion H

The capped chain extended epoxy from 1(a) above (533.68 g) and Desmophen 900U (79.63 g) were charged to a flask fitted with a stirrer, thermometer and condenser. The temperature was raised to 90° C. N-methyl ethanolamine (22.50 g), the amine bis epoxy adduct from 1(g)(i) above (94.10 g) and the amine mono-epoxy adduct from 1(b) above (73.06 g) were premixed, then added to the reaction flask over 2 minutes. Methyl isobutyl ketone (30.0 g) was used to rinse the premix vessel then added to the reaction mixture. A maximum exotherm temperature of 103° C. was observed, after which the temperature was raised to 125° C. and maintained until epoxy value reached zero and amine value, 1.117 mmolg$^{-1}$.

The isocyanate crosslinker from 1(c) above (530.84 g) was added and the temperature held at 125° C. for a further one hour.

The mixture was then cooled to 90° C., Cymel 1156 (34.13 g) and the anticrater agent from 1(d) above (48.76 g) were premixed and added to the reaction mixture. Methyl isobutyl ketone (15.0 g) was again used to rinse the premix vessel and added to the mixture.

After further cooling, lactic acid (80% aq) (47.99 g) was added and the mixture was stirred for 10 minutes.

The above product (1395.0 g) was emulsified with demineralised water (2108.7 g) using a 'Silverson' high speed disperser. The volatile solvents were removed from the emulsion by distillation.

The final product had a non volatile content of 36.12%.

(ii) Preparation of Coating Compositions H

Emulsion H from H(i) above (2035.9 g) demineralised water (2200.6 g) and pigment millbase from 1(f) above (563.5 g) were mixed together to give a composition of 0.2/1.0 (pigment/binder ratio) and a total solids content of 21.5%.

This was stirred for 24 hours before deposition.

RESULTS (a) Emulsion Properties

The general properties of Emulsions 1 to 5 and A to H are given below in Table 1:

TABLE 1

| Example | Particle Size (RM) | (20% Non-vol) pH | Conductivity | Static Stability |
|---|---|---|---|---|
| 1 | 115 | 6.0 | 1725 µsCM$^{-1}$ | Excellent |
| 2 | 120 | 5.95 | 1860 µsCM$^{-1}$ | Excellent |
| 3 | 137 | 5.80 | 1700 µsCM$^{-1}$ | Excellent |
| 4 | 145 | 5.60 | 1854 µsCM$^{-1}$ | Excellent |
| 5 | 140 | 5.60 | 1510 µsCM$^{-1}$ | Excellent |
| A | 133 | 5.0 | 1390 µsCM$^{-1}$ | Slight Settlement |
| B | 262 | 5.20 | 1354 µsCM$^{-1}$ | Settlement |
| C | 117 | 4.60 | 1130 µsCM$^{-1}$ | Slight Settlement |
| D | 180 | 6.1 | 1730 µsCM$^{-1}$ | Very Slight Settlement |
| E | 150 | 5.5 | 1535 µsCM$^{-1}$ | Excellent |
| F | 111 | 5.1 | 1636 µsCM$^{-1}$ | Excellent |
| G | 129 | 5.0 | 1713 µsCM$^{-1}$ | Excellent |
| H | 165 | 6.05 | 2070 µsCM$^{-1}$ | Excellent |

It can be seen from Table 1 that in examples A, B and C which fall outside the scope of the present invention in that the amine which is used to form component D does not conform to formula (1), the emulsions undergo an unsatisfactory degree of settling on standing.

(b) Deposition of Coating Compositions (i) The substrate

Two different types of substrate were used for the depositions, 6"×4" UMA 018 phosphated steel panels and 6"×4" Cold Steel 8704 bare steel panels. The phosphated panels were prebaked at 177° C. for 10 minutes prior to the deposition.

(ii) General deposition method

Steel test panels and a counter electrode were immersed in each of the coating compositions. In the case of compositions 1 to 5, A to C and E to H a potential difference of 300 volts was applied across the electrodes with the phosphated steel panels as cathodes for 135 seconds. Compositions 1 to 5, C and E to H were at a temperature of 30° C., while composition B was at 28° C. to avoid rupture of the deposited film during the depositions. Compositions D was deposited at 280 volts for 135 seconds at 29.5° C. to avoid rupture of the film during deposition. After the depositions each panel was rinsed with demineralised water, dried in air and then stoved at 180° C. for 15 minutes.

A summary of the deposition conditions is given in Table 2.

TABLE 2

Deposition of Compositions 1 to 5 and A to H

| Example | Coulombs Passed | Coulomb Yield | Film Build | Comments |
|---|---|---|---|---|
| 1 | 62 | 22.3 | 31.7µ | Fast polarisation |
| 2 | 38 | 18.8 | 15.7µ | Fast polarisation |
| 3 | 58 | 24.6 | 33.5µ | |
| 4 | 40 | 21.5 | 19.9µ | |
| 5 | 54 | 22.2 | 28.2µ | |
| A | 60 | 24.6 | 31.6µ | Slow to polarise tends to rupture |
| B | 65 | 26.0 | 30.9µ | V Slow to polarise tends to rupture |
| C | 48 | 29.2 | 32.6µ | Good polarisation |
| D | 27.8 | 20.1 | 12.25 | |
| E | 45.0 | 23.2 | 23.8 | |
| F | 43.0 | 22.5 | 21.75 | |
| G | 43.0 | 23.2 | 22.7 | |
| H | 40.0 | 18.0 | 15.6 | |

It can be seen from Table 2 that compositions A, and B which fall outside the present invention is that the amine of which is used to make the amine-epoxy reaction product (D) does not correspond to formula (1) do not deposit satisfactorily from the emulsions.

(c) Testing the deposited films

The stoved films formed from compositions 1 to 5 and A to H were subjected to the following tests:

i) Throw

This was measured according to Ford Motor Co. test method EUB1 20-2C. In this test, two 105 mm × 300 mm test panels are formed into a 'throwing power box' held apart by two insulators 10×4×300 mm. Electrodeposition was carried out as in Table 2 and the resulting films were stoved and then assessed. There were two assessments made, firstly the distance from the bottom edge of the panel to the point at which the coating thickness reached 5%, this is given as '5µ Throw' in Table 3. Secondly the film thickness on the side of the panel which had formed outside of the box was measured, this is given as 'outer box build' in Table 3.

ii) Corrosion Resistance

General Motors Cyclic Corrosion Test

This was carried out according to the General Motors Test Method 54-26. This test essentially comprises exposing coated panels which had been scribed through to the metal to the following cycle of tests:

a) Monday to Friday 15 minutes Immersion in 5% sodium chloride solutions 1h 15 mins—room temperature 22h 30 mins—humidity cabinet b) Monday Only 1 hour 60°

30 mins—10° F. Cold Cabinet c) Saturday and Sunday

Samples remain in humidity cabinet

One week day constitutes one cycle.

Twenty cycles over 28 days were carried out, and then the distance of cutback from the scribe line wa measured in millimeters.

A summary of the test results for compositions 1, and 9 to 13 is given in Table 3.

In Table 3 the Appearance is rated as follows:

1=Good, only slight texture

2=Peppery Texture

3=Some Cratering

TEST RESULTS

TABLE 3

| Example | 1 | 2 | 3 | 4 | 5 | A | B |
|---|---|---|---|---|---|---|---|
| Emulsion pH | 5.95 | 5.95 | 5.90 | 5.8 | 5.7 | 5.35 | 5.5 |
| Appearance | 1 | 2 | 1 | 1 | 1 | 3 | 3 |
| Throw: 5μ | 15.0 | 15.0 | 14.0 | 11.7 | 11.5 | 12.0 | 11.2 |
| Outer Box build (μ) | 27 | 15 | 27 | 19 | 24 | 27 | 25 |
| Cyclic Corrosion Test | 1.0–1.5 | 2.0–2.5 | 2.0–2.5 | 2.0–2.5 | 2.0–2.5 | 1.5–2.0 | 1.0–2.0 |

| Example | C | D | E | F | G | H |
|---|---|---|---|---|---|---|
| Emulsion pH | 5.05 | 6.00 | 5.85 | 5.50 | 5.45 | 6.15 |
| Appearance | 2 | 3 | 2 | 2 | 2 | 2 |
| Throw: 5μ | 12.5 | 13.0 | 14.0 | 13.2 | 13.7 | 11.2 |
| Outer Box build (μ) | 29 | 10.2 | 24.6 | 22.4 | 21.8 | 15.8 |
| Cyclic Corrosion Test | 1.5–2.0 | 3.5–6.0 | 4.0 | 3.0–4.0 | 1.5–2.5 | 3.5–4.5 |

It can be seen from Table 3 that only Example 1 to 5 which are according to the present invention exhibit both adequately high pH to avoid tank corrosion and good corrosion resistance in the General Motors Test. Examples A to H which fall outside the scope of the present invention either show unacceptably low emulsion pH or poor corrosion resistance.

I claim:

1. A non-gelled amine-epoxide reaction product and acid addition salts thereof where the product is obtained by coreacting;

A) a secondary amine NHR$^1$R$^2$, wherein R$^1$ and R$^2$ are the same or different and are C$^2$ or C$^3$ hydroxyalkyl groups, B) a polyepoxide, C) optionally a polyoxyalkylene polyamine, D) a product of the reaction between an epoxide with at least two epoxy groups and which contains less than 40% by weight of aromatic groups, and an amine of formula (1):

NR$^3$R$^4$(CH$_2$)$_n$NH$_2$  (1)

in which n is from 2 to 6, and where R$^3$ and R$^4$, are the same or different and are methyl or ethyl, and optionally, E) a monoepoxide the components of the product (D) being chosen so that the non-gelled amine epoxide reaction product is a liquid at temperatures above −5° C.

2. A non-gelled amine-epoxide reaction product according to claim 1 in which the secondary amine (A) is diethanolamine or dipropanolamine.

3. A non-gelled amine-epoxide reaction product according to claim 1 in which the polyepoxide (B) has an epoxy equivalent weight in the range 150 to 2500.

4. A non-gelled amine-epoxide reaction product according to claim 3 in which the polyepoxide (B) has an epoxy equivalent weight in the range 400 to 1000.

5. A non-gelled amine-epoxide reaction product according to claim 1 in which a proportion of the 1,2 epoxy functionality is capped.

6. A non-gelled amine epoxide reaction product according to claim 1 and having a polyoxyalkylene polyamine (C).

7. A non-gelled amine epoxide reaction product according to claim 6 in which the polyoxyalkylene polyamine (C) has a molecular weight in the range 150 to 4000.

8. A non-gelled amine epoxide reaction product according to claim 7 in which the polyoxyalkylene polyamine (C) has a molecular weight in the range 200 to 2000.

9. A non-gelled amine epoxide reaction product according to claim 6 in which the polyoxyalkylene polyamine (C) is a diamine of structure

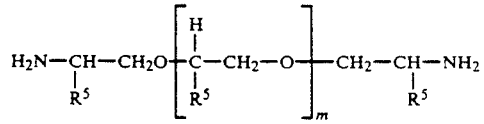

in which R$^5$ is hydrogen or C$_{1-6}$ alkyl and m is an integer from 1 to 50, or a triamine of structure

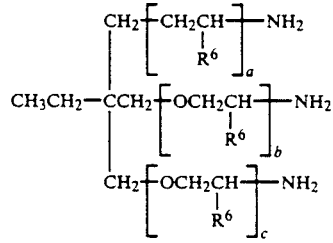

in which R$_6$ is hydrogen or a C$_{l-16}$ alkyl group, and a, b, and c are integers such that their sum is from 3 to 30.

10. A non-gelled amine epoxide reaction product according to claim 1 and having an idealized structure A—B—D—B—A.

11. A non-gelled amine epoxide reaction product according to claim 1 in which the molar ratio of A:B:C:D:E lies in the range 3 to 4 : 3 to 5 : 0.5 to 1.5 : 0.5 to 1.

12. A non-gelled amine-epoxide reaction product according to claim 1 in which the amine of formula (1) is dimethylaminopropylamine or diethylaminopropylamine.

13. A non-gelled amine-epoxide reaction product according to claim 1 in which the epoxide in product (D) contains less than 30% by weight of aromatic groups.

14. A non-gelled amine-epoxide reaction product according to claim 1 in which the diepoxide in product (D) has an epoxide equivalent weight in the range 100 to 2500.

15. An acid addition salt of an amine-epoxide reaction product according to claim 1.

16. A salt according to claim 15 being a lactic acid salt.

17. A process for preparing a non-gelled amine-epoxide reaction product and acid addition salts thereof according to claim 1 which comprises reacting any of the co-reactive components (A) to (E) in any order simultaneously or sequentially, and thereafter optionally reacting the non-gelled amine-epoxide reaction product so obtained with a salt forming acid.

18. An aqueous dispersion of an acid addition salt of a non-gelled amine epoxide reaction product according to claim 15.

* * * * *